(12) United States Patent
Abe

(10) Patent No.: US 12,481,230 B2
(45) Date of Patent: Nov. 25, 2025

(54) OPTICAL SCANNING DEVICE

(71) Applicant: CANON KABUSHIKI KAISHA, Tokyo (JP)

(72) Inventor: Ryo Abe, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/501,140

(22) Filed: Nov. 3, 2023

(65) Prior Publication Data
US 2024/0152069 A1 May 9, 2024

(30) Foreign Application Priority Data

Nov. 7, 2022 (JP) ................................ 2022-177969

(51) Int. Cl.
G03G 15/04 (2006.01)
G02B 26/12 (2006.01)
G02B 27/00 (2006.01)

(52) U.S. Cl.
CPC ..... G03G 15/04036 (2013.01); G02B 26/121 (2013.01); G02B 27/0006 (2013.01)

(58) Field of Classification Search
CPC ............ G03G 15/04; G03G 15/04036; G03G 15/0409; G02B 26/12; G02B 26/121; G02B 27/0006
See application file for complete search history.

(56) References Cited

U.S. PATENT DOCUMENTS

2009/0296179 A1* 12/2009 Murakami ........... G02B 26/121
359/198.1
2018/0231913 A1 8/2018 Ishidate et al.

FOREIGN PATENT DOCUMENTS

JP 2007121586 A 5/2007

* cited by examiner

*Primary Examiner* — Thomas S Giampaolo, II
(74) *Attorney, Agent, or Firm* — ROSSI, KIMMS & McDOWELL LLP

(57) ABSTRACT

An optical scanning device configured to expose a charged surface of a photosensitive member to form an electrostatic latent image includes a light source configured to emit light, a deflector configured to deflect the light emitted from the light source, a driving unit configured to rotationally drive the deflector, a control substrate provided with the driving unit and the deflector and configured to control the driving unit, a cover member configured to cover the deflector, a casing on which the control substrate is mounted, a fixing portion configured to fix the control substrate to the casing, and a plurality of engagement members configured to jointly engage and fix the cover member and the control substrate to the casing such that the cover member is detachably attached.

15 Claims, 11 Drawing Sheets

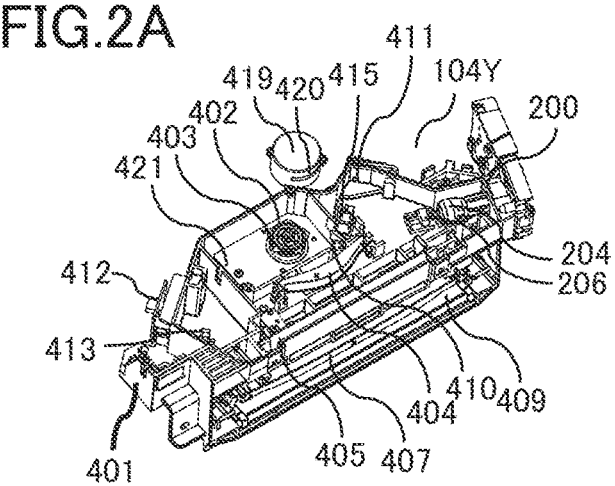
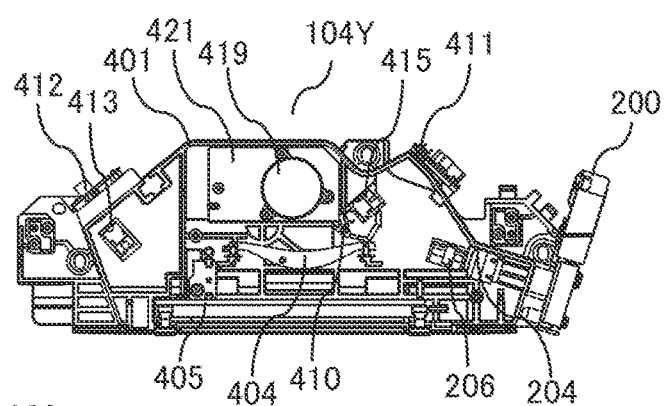
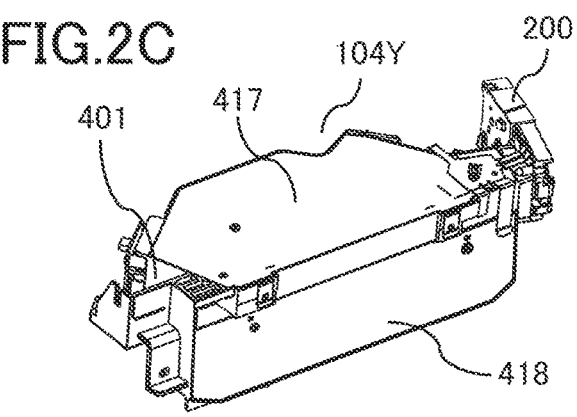
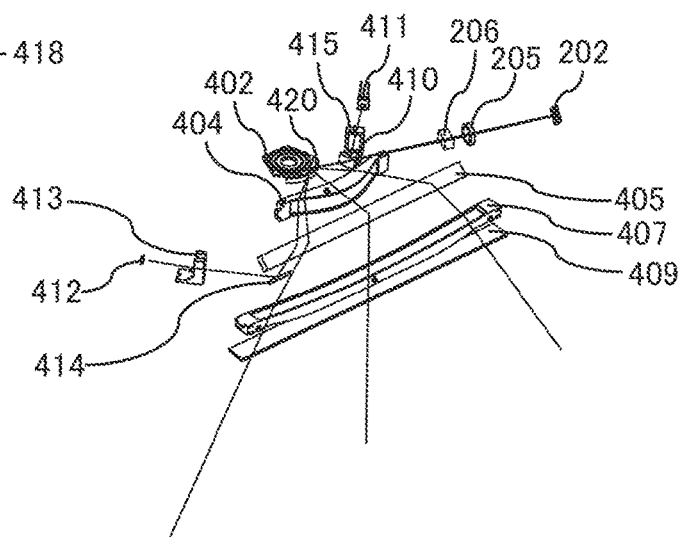

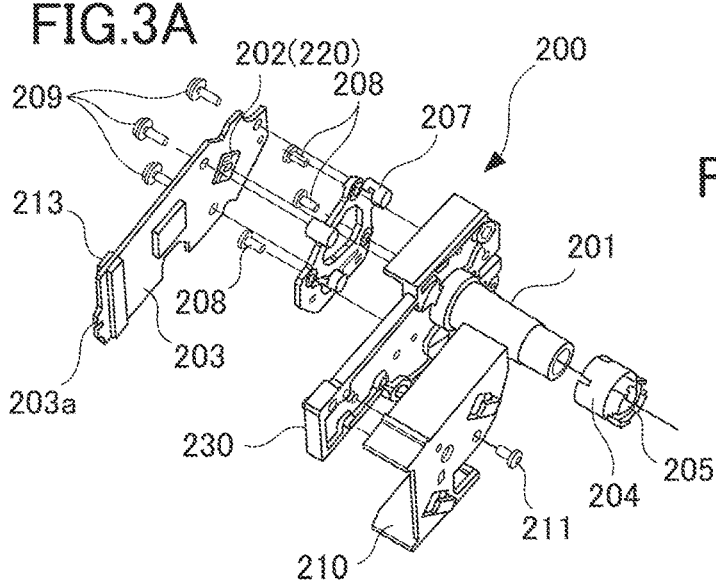
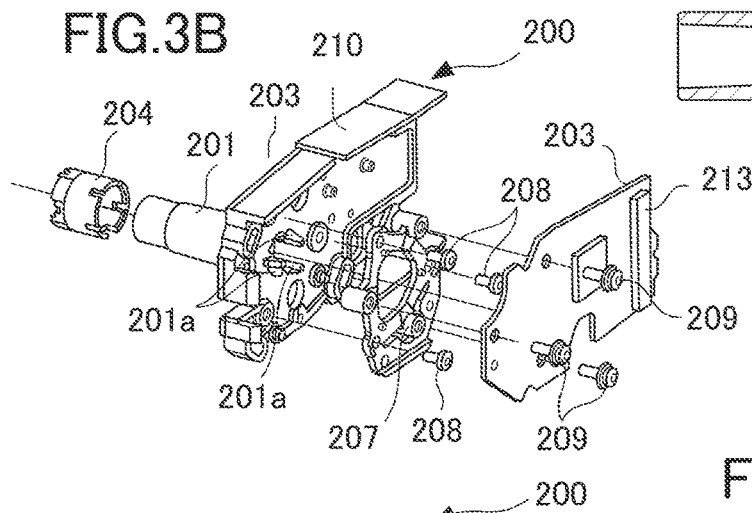
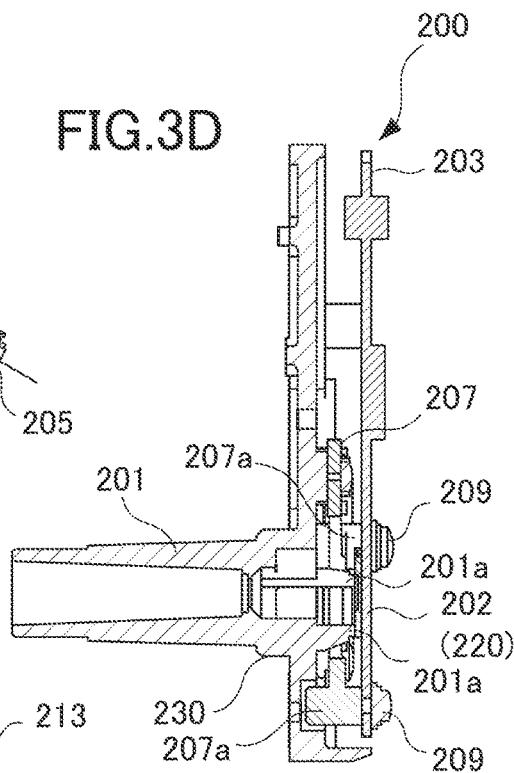
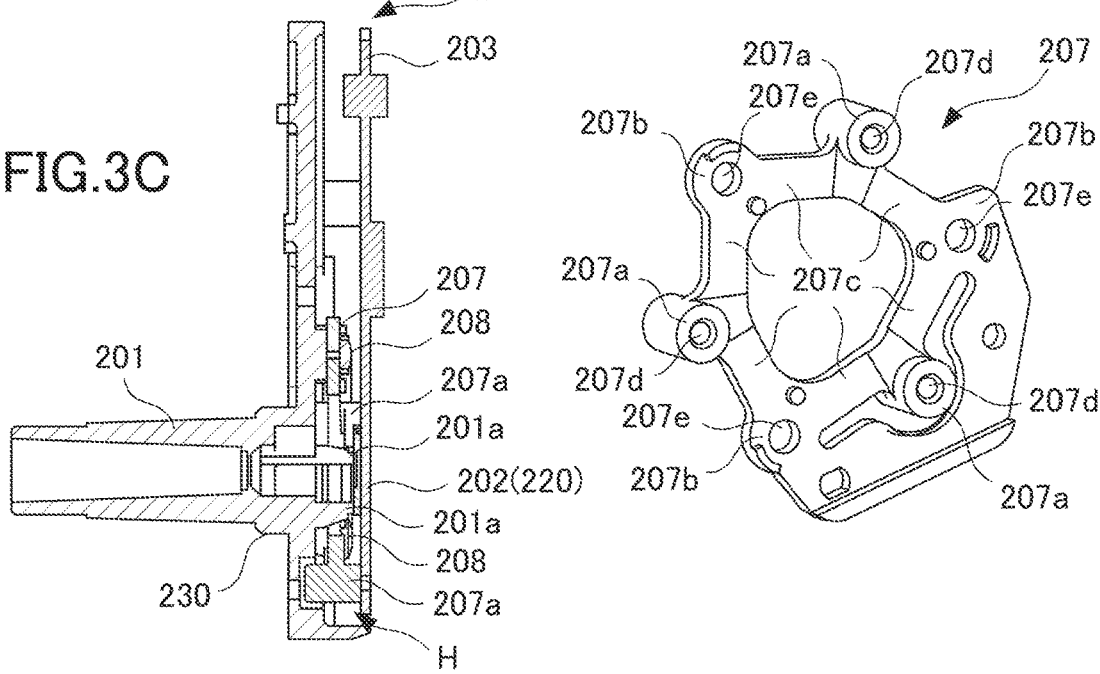
FIG.3A FIG.3B FIG.3C FIG.3D FIG.3E

OPTICAL SCANNING DEVICE

BACKGROUND OF THE INVENTION

Field of the Invention

The present invention relates to an optical scanning device suitable for use in an image forming apparatus such as a copying machine, a printer, a facsimile machine, or a multifunction peripheral.

Description of the Related Art

An electrophotographic image forming apparatus includes an optical scanning device that emits laser light in order to scan and expose a surface of a photosensitive drum. The optical scanning device includes a light source that emits laser light, a rotary polygon mirror that deflects the laser light, a motor that rotates the rotary polygon mirror, and optical components such as a lens and a mirror arranged on an optical path of the laser light.

Recently, there is an increasing demand for high-speed printing, and in an optical scanning device, a rotary polygon mirror is rotated at a high speed by a motor in order to increase a scanning speed of a photosensitive drum with laser light. However, when the rotary polygon mirror is rotated at a high speed, dusts and dirt contained in the air adhere to the reflecting surface of the rotary polygon mirror due to an airflow generated by the rotation of the rotary polygon mirror, and the reflectance of the rotary polygon mirror is likely to decrease. If the reflectance of the rotary polygon mirror decreases, the light amount of reflected laser light decreases, and the image quality of a toner image formed on the recording material may decrease.

Therefore, hitherto, an optical scanning device in which a rotary polygon mirror is covered with a cover member is proposed (JP 2007-121586 A). By covering the rotary polygon mirror with the cover member, adhesion of dusts and dirt to the reflecting surface of the rotary polygon mirror is suppressed. As disclosed in JP 2007-121586 A, in an optical scanning device hitherto, a control substrate provided with a cover member, a rotary polygon minor, and a motor is fixed to an attachment plate from the inside of a casing portion with a plurality of screws, and the attachment plate is fixed to the casing portion from the outside of the casing portion with another screw.

Even if the rotary polygon minor is covered with the cover member, dusts or dirt may actually intrude into the cover member through a gap, and the dusts or the dirt may adhere to the reflecting surface of the rotary polygon mirror. Therefore, it is necessary to remove the cover member in order to clean the rotary polygon mirror. However, in a case where the cover member is removed, hitherto, the control substrate is also removed from the casing portion. For this reason, when the control substrate is attached again to the casing portion, hitherto, it is concerned that the position and posture of the control substrate with respect to the casing portion are changed from those before removal. If the position and posture of the control substrate are changed, the rotary polygon minor is affected, the position of the laser light applied to the photosensitive drum deviates from a desired position, and image defects such as image deviation occur. Therefore, the change is not preferable.

SUMMARY OF THE INVENTION

According to one aspect of the present invention, an optical scanning device configured to expose a charged surface of a photosensitive member to form an electrostatic latent image includes a light source configured to emit light, a deflector configured to deflect the light emitted from the light source, a driving unit configured to rotationally drive the deflector, a control substrate provided with the driving unit and the deflector and configured to control the driving unit, a cover member configured to cover the deflector, a casing on which the control substrate is mounted, a fixing portion configured to fix the control substrate to the casing, and a plurality of engagement members configured to jointly engage and fix the cover member and the control substrate to the casing such that the cover member is detachably attached.

Further features of the present invention will become apparent from the following description of exemplary embodiments with reference to the attached drawings.

BRIEF DESCRIPTION OF THE DRAWINGS

FIG. 2A is a perspective view illustrating the optical scanning device in a state where a cover member is removed.

FIG. 2B is a top view illustrating the optical scanning device.

FIG. 2C is a perspective view illustrating the optical scanning device to which an upper lid is attached.

FIG. 2D is a perspective view illustrating an optical component.

FIG. 3A is an exploded perspective view illustrating an optical unit as viewed from a lens barrel unit side.

FIG. 3B is an exploded perspective view illustrating the optical unit as viewed from a laser substrate side.

FIG. 3C is a cross-sectional view illustrating the optical unit before the lens barrel unit is assembled.

FIG. 3D is a cross-sectional view illustrating the optical unit after the lens barrel unit is assembled.

FIG. 3E is a perspective view illustrating a substrate support member.

DESCRIPTION OF THE EMBODIMENTS

First Embodiment

Image Forming Apparatus

Figure 1:
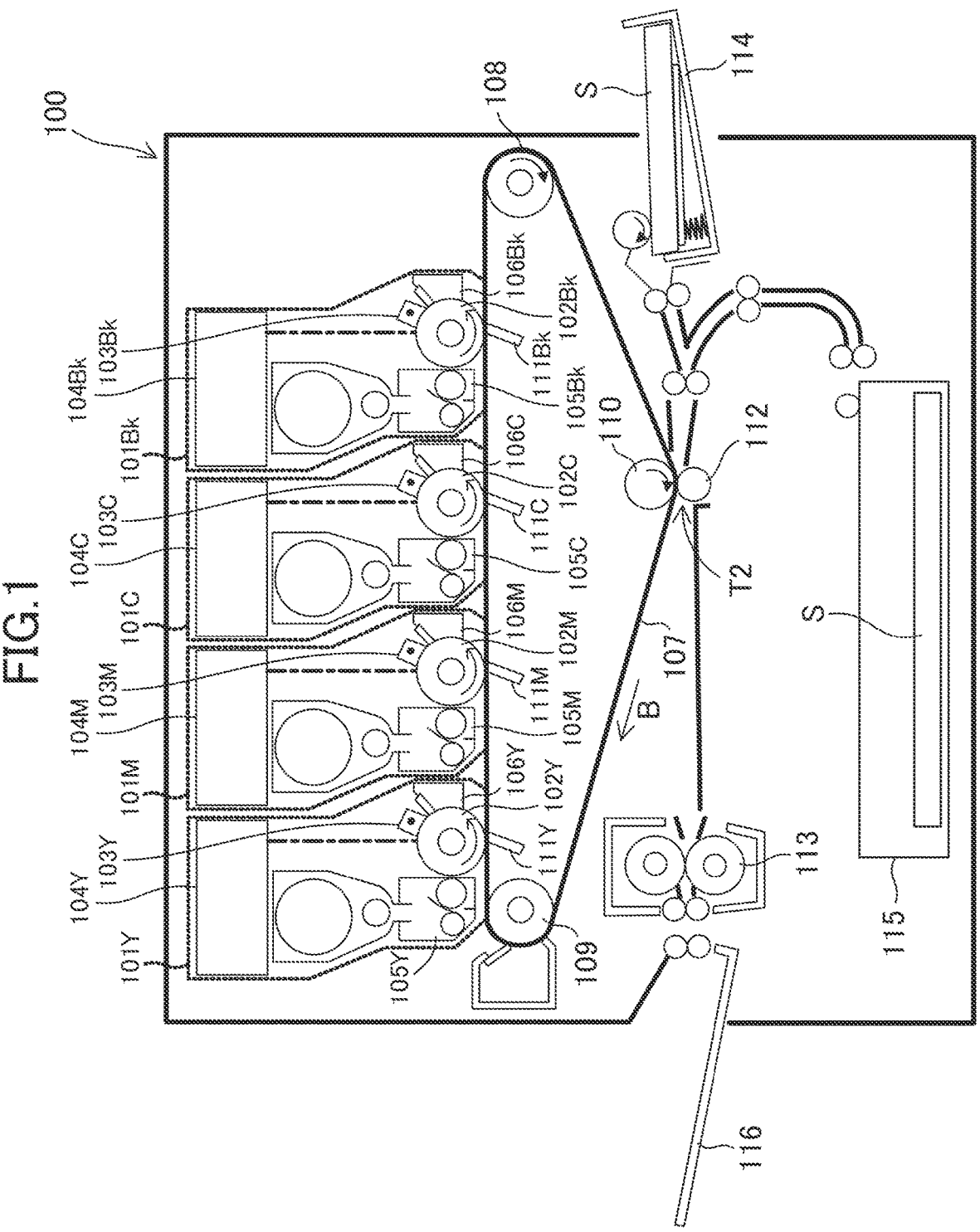
FIG. 1 is a schematic view illustrating a suitable image forming apparatus by using an optical scanning device according to an embodiment.

A present embodiment is described. First, a schematic configuration of a suitable image forming apparatus by using an optical scanning device according to the present embodiment is described with reference to FIG. 1. An image forming apparatus 100 illustrated in FIG. 1 is a tandem color laser printer that forms an image on a recording material by using toners of a plurality of colors. Note that the image forming apparatus to which the optical scanning device according to the present embodiment can be applied is not limited thereto and may be a monochrome laser printer or the like that forms an image on a recording material with only monochromatic (for example, black) toner.

The image forming apparatus 100 includes four image forming units 101Y, 101M, 101C, and 101Bk that form toner images for respective colors of yellow, magenta, cyan, and black. These four image forming units 101Y, 101M, 101C, and 101Bk have substantially the same configuration except that the colors of the toners are different. Therefore, hereinafter, an image forming process of forming a toner image on the recording material S is described with reference to the image forming unit 101Y that forms a yellow toner image as an example.

The image forming unit 101Y includes a photosensitive drum 102Y, a charging device 103Y, an optical scanning device 104Y, a developing device 105Y, a drum cleaning device 106Y, and the like. The charging device 103Y uniformly charges the surface of the photosensitive drum 102Y serving as a rotating photosensitive member. The uniformly charged surface of the photosensitive drum 102Y is exposed to the laser light emitted from the optical scanning device 104Y. As a result, an electrostatic latent image is formed on the rotating photosensitive drum 102Y. Details of the optical scanning device 104Y are described below. The developing device 105Y develops the electrostatic latent image formed on the photosensitive drum 102Y by using a developer to form a yellow toner image.

An endless belt-shaped intermediate transfer belt 107 is disposed below the photosensitive drum 102Y. The intermediate transfer belt 107 is stretched around a driving roller 108, a driven roller 109, and a secondary transfer inner roller 110 and rotates in a direction indicated by an arrow B in FIG. 1. A primary transfer device 111Y is disposed at a position facing the photosensitive drum 102Y with the intermediate transfer belt 107 interposed therebetween. In response to application of a primary transfer voltage to the primary transfer device 111y, the toner image on the photosensitive drum 102Y is primarily transferred to the intermediate transfer belt 107. The toner remaining on the photosensitive drum 102Y after the primary transfer is removed by the drum cleaning device 106Y.

The toner image primarily transferred to the intermediate transfer belt 107 is secondarily transferred to the recording material S conveyed from a manual sheet feeding cassette 114 or a sheet feeding cassette 115 to a secondary transfer portion T2. The secondary transfer portion T2 is a transfer nip portion formed by the secondary transfer inner roller 110 and a secondary transfer outer roller 112, and for example, the toner image is secondarily transferred from the intermediate transfer belt 107 onto the recording material S in response to application of a secondary transfer voltage to the secondary transfer outer roller 112. Thereafter, the recording material S is conveyed to a fixing device 113, and the toner image is fixed on the recording material S by being heated and pressurized by the fixing device 113. The recording material S on which the toner image is fixed is discharged to a sheet discharge tray 116. Note that examples of the recording material S include various types of sheet materials including paper such as plain paper, thick paper, rough paper, uneven paper, and coated paper, a plastic film, cloth, and the like.

Schematic Configuration of Optical Scanning Device

Next, a schematic configuration of the optical scanning device 104Y of the present embodiment is described with reference to FIGS. 2A to 4B, referring to FIG. 1. FIGS. 2A and 2B show a state in which an upper lid 417 and a lateral lid 418 (see FIG. 2C) described below are removed. Since the configurations of the optical scanning devices 104Y, 104M, 104C, and 104Bk are the same, the optical scanning device 104Y is described in the present specification, and the description of the other optical scanning devices 104M, 104C, and 104Bk is omitted.

As illustrated in FIGS. 2A and 2B, the optical scanning device 104Y of the present embodiment includes an optical box 401, an optical unit 200, a cover member 419, a rotary polygon mirror 402, a motor 403, a motor substrate 421, and optical components such as lenses and mirrors described below.

The optical box 401 serving as a casing supports the optical unit 200 on one side, and the optical box 401 contains the rotary polygon mirror 402, the motor 403, the motor substrate 421, and the optical components therein. The optical box 401 has an opening portion on each of the upper surface, the lower surface, and the front surface, and an opening portion in the lower surface of the optical box 401 is sealed with a dust-proof glass 409. In addition, as illustrated in FIG. 2C, an opening portion in the upper surface of the optical box 401 is sealed with the detachable upper lid 417, and an opening portion in the front surface of the optical box 401 is sealed with the lateral lid 418. In this manner, the optical box 401 is substantially sealed so that dust and dirt hardly intrude from the outside. In the case of the present embodiment, the cover member 419 contained in the optical box 401 is detachably attached to the motor substrate 421 in a state where the upper lid 417 is removed from the optical box 401.

Optical Unit

The optical unit 200 supported by the optical box 401 is described with reference to FIGS. 3A to 4B. As illustrated in FIGS. 3A to 3D, the optical unit 200 includes a semiconductor laser 202 serving as a light source that emits laser light for exposing the photosensitive drum 102Y, a laser substrate 203 for driving the semiconductor laser 202, a laser holder 201, a lens barrel unit 204, a substrate support member 207, a wiring guide member 210, and the like.

As illustrated in FIGS. 3A and 3B, the laser holder 201 is provided with an attachment portion 230 for attaching the optical unit 200 to the optical box 401 (see FIG. 2A). The lens barrel unit 204 is disposed at a front end portion of the laser holder 201. A collimator lens 205 that converts laser light (divergent light) emitted from the semiconductor laser 202 into parallel light is attached to the lens barrel unit 204. An installation position of the collimator lens 205 on the laser holder 201 is adjusted by detecting an irradiation position and a focus of laser light emitted from semiconductor laser 202 with a specific jig at the time of assembling the optical scanning device 104. When the installation position of the collimator lens 205 is determined, an ultraviolet curable adhesive applied in advance between the laser holder 201 and the lens barrel unit 204 is irradiated with ultraviolet light, whereby the collimator lens 205 is fixed to the laser holder 201 via the lens barrel unit 204.

The laser holder 201 holds the laser substrate 203 via the substrate support member 207. The substrate support member 207 is provided to attach the laser substrate 203 to the laser holder 201. The substrate support member 207 is formed to be able to support the laser substrate 203 by using an elastic material having elasticity, for example, resin. As illustrated in FIG. 3E, the substrate support member 207 includes a plurality of substrate support portions 207a, a plurality of holder support portions 207b, and a plurality of connection portions 207c respectively connecting the substrate support portions 207a and the holder support portions 207b. In the present embodiment, a screw hole 207d to be engaged with a screw 209 for attaching the substrate support member 207 to the laser substrate 203 is formed in each of the three substrate support portions 207a. A hole 207e through which a screw 208 for fixing the substrate support member 207 to the laser holder 201 passes is formed in each of the three holder support portions 207b.

The semiconductor laser 202 is electrically connected to the laser substrate 203 and emits laser light by a drive signal supplied from the laser substrate 203. Then, the laser light converted into the parallel light by collimator lens 205 is linearly imaged on the reflecting surface of the rotary polygon mirror 402 (see FIG. 2A) by a cylindrical lens 206.

The laser substrate 203 is electrically connected to a control unit 501 (see FIG. 5 described below) via a flexible cable (not illustrated). The flexible cable (not illustrated) is connected to a connector 213 provided near a side end portion 203a of the laser substrate 203. The wiring guide member 210 is engaged with the attachment portion 230 of the laser holder 201 by a screw 211 to guide the flexible cable (not illustrated).

Semiconductor Laser

Figure 4A:
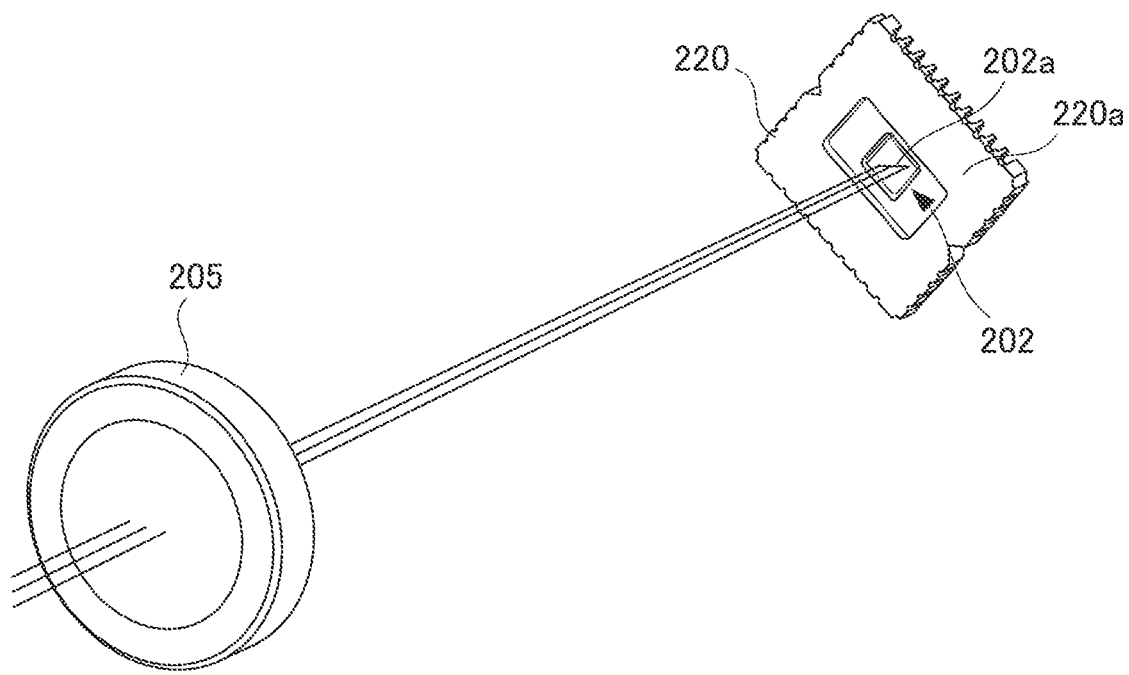
FIG. 4A is a schematic view illustrating a semiconductor laser.
Figure 4B:
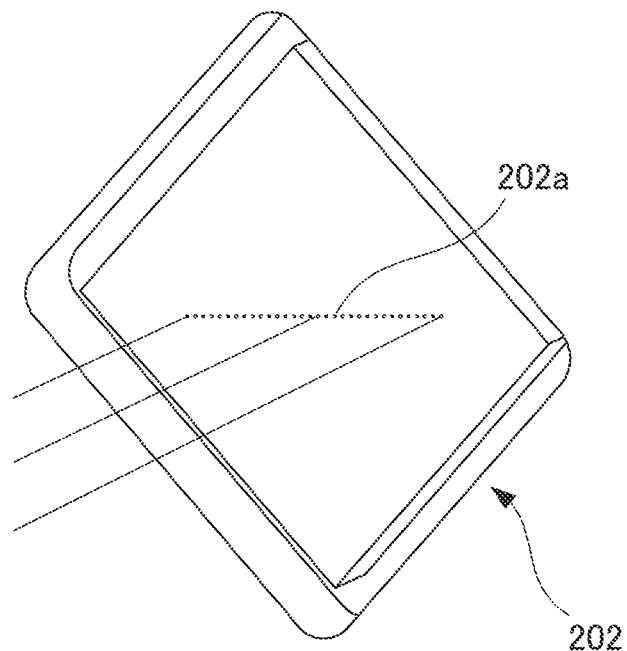
FIG. 4B is an enlarged view illustrating the semiconductor laser.

As illustrated in FIG. 4A, the semiconductor laser 202 is installed on a ceramic package member 220 formed in a rectangular shape and is held on the laser substrate 203 via the package member 220. The semiconductor laser 202 includes a plurality of light emitting elements 202a that each emit laser light. The plurality of light emitting elements 202a are, for example, vertical cavity surface emitting laser (VCSEL) and are arranged in one row (an array shape) as illustrated in FIG. 4B. The semiconductor laser 202 is disposed such that a plurality of rays of laser light emitted from the plurality of light emitting elements 202a forms images at different positions on the photosensitive drum 102Y. Note that the plurality of light emitting elements 202a is not limited to be arranged in one row and may be arranged in a plurality of rows.

Here, attachment of the laser substrate 203 to the laser holder 201 is described with reference to FIGS. 3A to 3E and FIG. 4A. First, the substrate support member 207 is fixed to the attachment portion 230 of the laser holder 201 by three screws 208. Next, a reference surface 220a on the opposite side of the laser substrate 203 in the package member 220 attached to the laser substrate 203 is brought into contact with a plurality of (three in the present embodiment) contact portions 201a protruding from the attachment portion 230 of the laser holder 201. At this time, as illustrated in FIG. 3C, a gap H is formed between the substrate support portion 207a of the substrate support member 207 and the laser substrate 203.

Then, if the screw 209 is engaged in order to attach the substrate support member 207 to the laser substrate 203, the connection portion 207c elastically deforms with respect to the substrate support member 207 so that the substrate support portion 207a comes into close contact with the laser substrate 203 as illustrated in FIG. 3A. At this time, the package member 220 is brought into contact with and fixed to the contact portion 201a of the laser holder 201 by the restoration force of the substrate support member 207 generated by the elastic deformation of the connection portion 207c. With such attachment, the contact portion 201a is brought into contact with the reference surface 220a of the package member 220 to define the direction of the optical axis of the semiconductor laser 202, and thus the optical axis direction of the semiconductor laser 202 is set with high accuracy.

Referring back to the description of the optical scanning device 104Y, as illustrated in FIG. 2A, the rotary polygon mirror 402 as a deflector that deflects the laser light emitted from the optical unit 200 is provided inside the optical box 401 so that the photosensitive drum 102Y is scanned with the laser light in a main scanning direction (rotation axis direction). The laser light emitted from the optical unit 200 passes through a light transmitting member 420 provided in the cover member 419 and is incident onto the rotary polygon mirror 402. The light transmitting member 420 is a transparent member such as glass or a film. The rotary polygon mirror 402 is rotationally driven by the motor 403 serving as a driving unit.

As illustrated in FIG. 2D, the laser light emitted from semiconductor laser 202 passes through the collimator lens 205 and the cylindrical lens 206, reaches the rotary polygon mirror 402, and is deflected by the rotary polygon mirror 402. The laser light deflected by the rotary polygon mirror 402 is incident on a first fθ lens 404. The laser light that has passed through the first fθ lens 404 is reflected by a reflecting mirror 405 to be incident on a second fθ lens 407. The laser light that has passed through the second fθ lens 407 passes through the dust-proof glass 409 and is guided to the surface of the photosensitive drum 102Y. With the above configuration, the laser light applied by the rotary polygon mirror 402 at an equal angular speed forms an image on the photosensitive drum by the first fθ lens 404 and the second fθ lens 407 and is applied to the surface of the photosensitive drum 102Y at an equal speed.

Furthermore, the optical scanning device 104Y of the present embodiment includes a beam splitter 410. As illustrated in FIG. 2D, the beam splitter 410 is disposed on an optical path of the laser light emitted from the semiconductor laser 202 to the rotary polygon mirror 402. The beam splitter 410 separates the incident laser light into first laser light that is transmitted light and second laser light that is reflected light. The first laser light is deflected by the rotary polygon mirror 402 and guided to the surface of the photosensitive drum 102Y as described above. The second laser light passes through a condenser lens 415 and is incident on a photodiode 411 serving as a photoelectric conversion element. The photodiode 411 outputs a detection signal according to the light amount of the received light. The detection signal of the photodiode 411 is a voltage value and is used for automatic light amount control (automatic power control; APC) for controlling the light amount of the laser light emitted by each of the plurality of light emitting elements 202a.

Furthermore, the optical scanning device 104 of the present embodiment includes a beam detector 412 that generates a synchronization signal for determining an emission timing of the laser light based on image data. The laser light (first laser light) deflected by the rotary polygon mirror 402 passes through the first fθ lens 404, is reflected by the reflecting mirror 405 and a mirror 414, passes through a lens 413, and then is incident on the beam detector 412.

Control Block of Optical Scanning Control System

Figure 5:
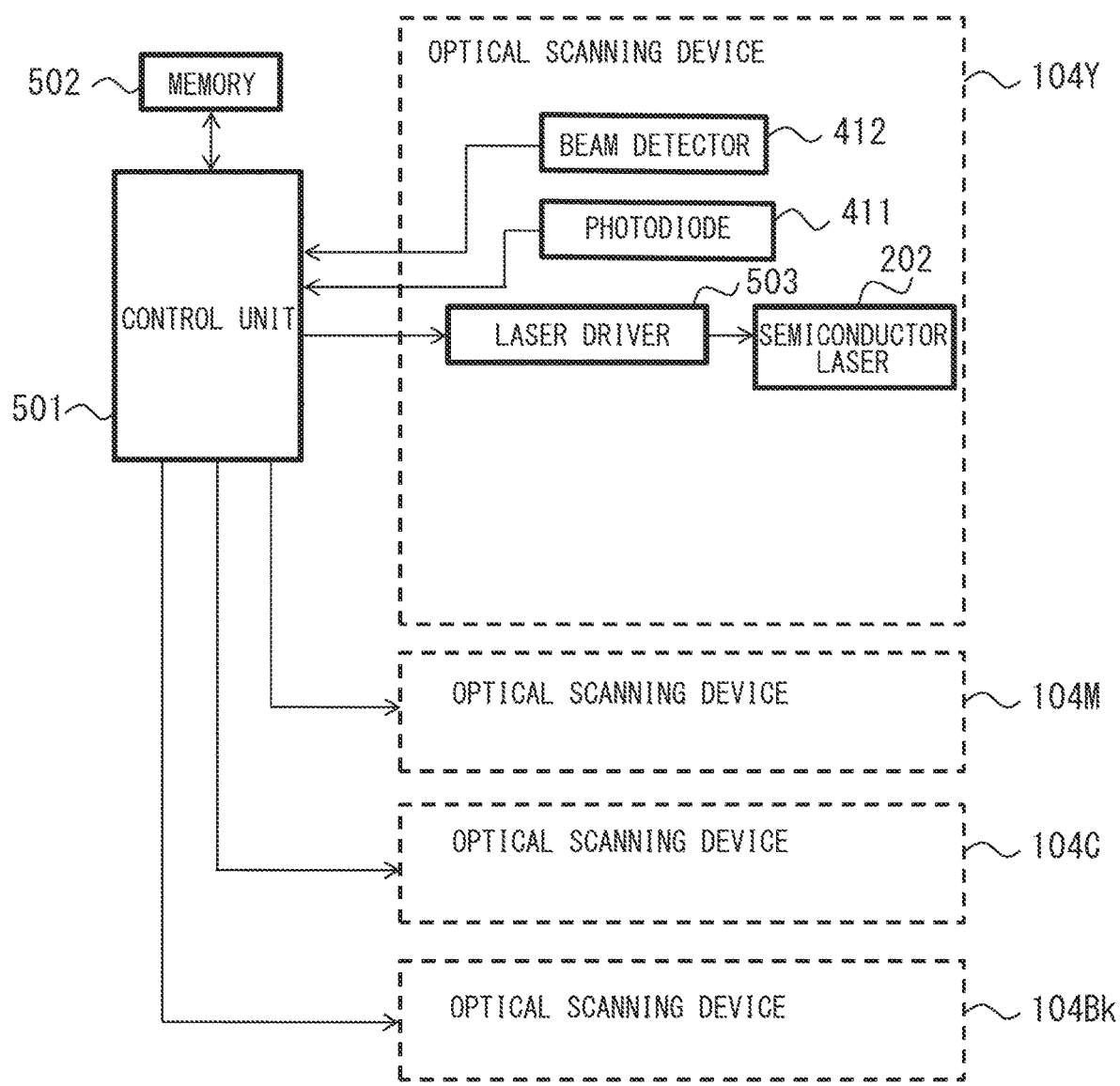
FIG. 5 is a control block diagram illustrating an optical scanning control system.

FIG. 5 is a control block diagram of the optical scanning control system that scans the surface of the photosensitive drum with the laser light emitted from the optical scanning device to form an electrostatic latent image. The image forming apparatus 100 includes the control unit 501, and the control unit 501 is, for example, a central processing unit (CPU) that performs various controls of the image forming apparatus 100 such as an image forming operation. Note that the control unit 501 can control the above-described units (see FIG. 1) in addition to the optical scanning devices 104Y to 104Bk illustrated in the drawing, but illustration and description thereof are omitted here because the control is not the gist of the technology.

As illustrated in FIG. 5, a memory 502 is connected to the control unit 501. The memory 502 is a ROM, a RAM, a hard disk, or the like and stores, for example, various control programs of an image forming operation or the like, various data, and the like. For example, in addition to the control program, the memory 502 stores a reference voltage value used when the automatic light amount control is executed, first to fourth times (timing data) described below that define the emission timing of each light emitting element 202a, and the like. Note that, although not illustrated, the control unit 501 includes a clock signal generation unit such as a crystal oscillator that generates a clock signal having a higher frequency than the synchronization signal for determining the emission timing of the laser light, a counter that counts time based on the clock signal, and the like. For example, whenever a synchronization signal (see FIG. 6) described below is output, the control unit 501 resets the count value and starts counting.

A synchronization signal output from the beam detector 412 and a detection signal output from the photodiode 411 are input to the control unit 501, and a control signal is transmitted to a laser driver 503 based on the synchronization signal. The laser driver 503 transmits a drive signal to the semiconductor laser 202 based on the control signal.

Figure 6:
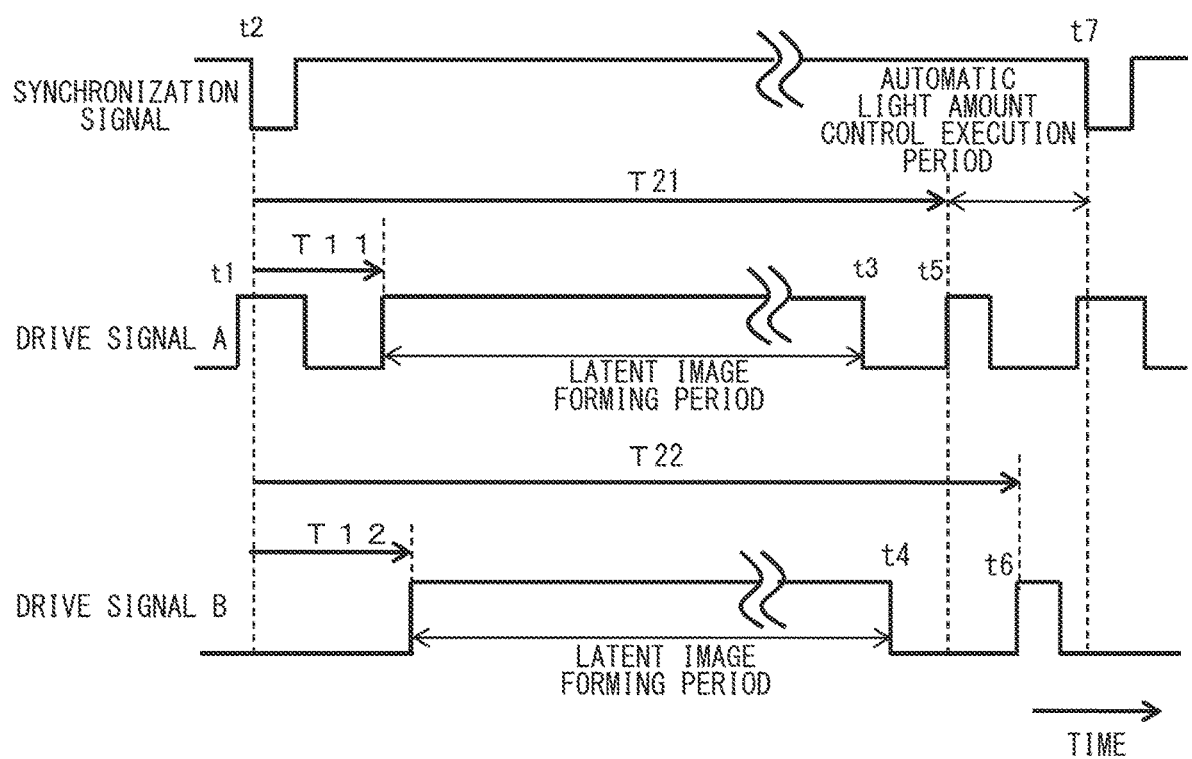
FIG. 6 is a timing chart showing optical scanning control performed within one scanning period.

FIG. 6 illustrates a timing chart of optical scanning control performed within one scanning period for scanning once with laser light. In FIG. 6, the horizontal axis represents time. Here, for easy understanding of the description, two light emitting elements A and B among the plurality of light emitting elements 202a are described.

The upper part of FIG. 6 illustrates a synchronization signal (pulse) output from the beam detector 412. The middle part of FIG. 6 illustrates a drive signal A transmitted from the laser driver 503 to the light emitting element A, which is one of the plurality of light emitting elements 202a included in the semiconductor laser 202. The lower part of FIG. 6 illustrates a drive signal B transmitted from the laser driver 503 to the light emitting element B, which is another one of the plurality of light emitting elements 202a of the semiconductor laser 202.

In order to cause the beam detector 412 to output a synchronization signal, the control unit 501 causes the laser driver 503 to transmit a preliminary drive signal as a drive signal A for driving the light emitting element A (t1). The light emitting element A emits laser light for a relatively short period of time in response to the preliminary drive signal. At this time, the photosensitive drum 102Y is not exposed. The beam detector 412 outputs a synchronization signal in response to receiving the laser light emitted from the light emitting element A (t2).

The control unit 501 causes the laser driver 503 to start emission of the laser light based on the image data in response to the count value counted in response to the output of the synchronization signal reaching predetermined first time and second time set in advance in accordance with the light emitting elements A and B. For example, the control unit 501 causes the laser driver 503 to start emission of laser light for forming a toner image on the photosensitive drum 102Y after the elapse of the first time T11 and the second time T12 from the output of the synchronization signal (t2). Then, during the latent image forming period illustrated in the drawing, the photosensitive drum 102Y is exposed by emitting laser light based on image data from the light emitting elements A and B, thereby forming an electrostatic latent image. Note that the control unit 501 determines an exposure start position in the main scanning direction with respect to the photosensitive drum 102Y based on the output timing (t2) of the synchronization signal from the beam detector 412.

The control unit 501 ends the emission of the laser light by the light emitting elements A and B at the end of each latent image forming period. (t3 and t4). After emission of the laser light by the light emitting elements A and B is ended (t3 and t4), the control unit 501 causes the light emitting elements A and B to individually emit the laser light in response to the count value reaching predetermined third time and fourth time set in advance corresponding to the light emitting elements A and B (t5 and t6). At this time, the photosensitive drum 102Y is not exposed. Then, the control unit 501 performs "automatic light amount control" on each of the light emitting elements A and B based on a detection signal output from the photodiode 411 that has received the laser light emitted from the light emitting elements A and B. For example, after the synchronization signal is output (t2), and the third time T21 elapses (t5), the control unit 501 performs automatic light amount control for the light emitting element A. Also, after the synchronization signal is output (t2), and the fourth time T22 elapses (t6), the control unit 501 performs automatic light amount control for the light emitting element B. For both the light emitting elements A and B, the automatic light amount control is executed until the next synchronization signal is output (t7: automatic light amount control execution period).

The control unit 501 compares a detection signal (voltage value) of the photodiode 411 with a reference voltage value corresponding to a target light amount stored in advance in the memory 502. Then, the control unit 501 controls the light amount of the laser light emitted from the light emitting elements A and B according to drive current values respectively corresponding to the drive signals A and B obtained based on the difference between the voltage values. For example, when the detection signal of the photodiode 411 is lower than the reference voltage value, the drive current value supplied from the laser driver 503 to the light emitting elements A or B is increased to increase the light amount of the laser light. On the other hand, when the detection signal of the photodiode 411 is higher than the reference voltage value, the current supplied from the laser driver 503 to the light emitting elements A and B is decreased to decrease the light amount of the laser light. By performing such control, laser light having a light amount following each target light amount is emitted from the light emitting elements A and B.

The first to fourth predetermined times (T11, T12, T21, and T22) are set in advance in consideration of the rotational speed of the rotary polygon mirror 402 based on timings at which the laser light deflected by the rotary polygon mirror 402 is incident on each of the beam detector 412 and the photodiode 411. The first and second predetermined times and the third and fourth predetermined times may be respectively set to the same time, or all of the first to fourth predetermined times may be set to the same time.

Attachment Configuration of Optical Scanning Device

Next, the attachment configuration of the motor 403, the rotary polygon mirror 402, the cover member 419, and the motor substrate 421 in the optical scanning device 104Y of the present embodiment is described with reference to FIGS. 7A to 8B referring to FIGS. 2A and 2B. However, in FIGS. 7A to 7C, for easy understanding of the description, only a part of the optical box 401 in which the motor 403, the rotary polygon mirror 402, the cover member 419, and the motor substrate 421 are mounted is illustrated. In the drawing, an X direction indicates the axial direction of a rotation shaft 403a of the motor 403, a Y direction indicates the main scanning direction of the laser light applied by the rotation of the rotary polygon mirror 402, and a Z direction orthogonal to the X direction and orthogonal to the Y direction indicates the sub-scanning direction of the laser light. In the present embodiment, the X direction is also the thickness direction of the motor substrate 421.

The motor 403 is rotationally driven in accordance with a control signal from the motor substrate 421. The motor 403 is fixed on the motor substrate 421 in a state of being fitted to a fitting portion 421c formed on the motor substrate 421. In the case of the present embodiment, the rotary polygon mirror 402 is provided so as to rotate about the rotation shaft 403a of the motor 403.

The motor substrate 421 as a control substrate is a substrate that controls driving of the motor 403, and for example, an electronic circuit in which electronic components and the like are mounted on a plate-shaped printed wiring board is formed. In addition to the fitting portion 421c to be fitted to the motor 403, a U groove 421d is formed in the motor substrate 421. The U groove 421d is fitted to a rotation stopper portion 401d of the optical box 401 described below.

In the case of the present embodiment, the cover member 419 is detachably provided to the motor substrate 421 and covers the rotary polygon mirror 402 and the motor 403 on the motor substrate 421. In the cover member 419, a window portion 419a opened for allowing the laser light emitted from the optical unit 200 to be incident on the rotary polygon mirror 402 is formed, and the window portion 419a is closed by the light transmitting member 420 through which the laser light passes. The laser light emitted from the optical unit 200 passes through the light transmitting member 420 without the light amount reduced and is incident onto the rotary polygon mirror 402.

Since the rotary polygon mirror 402 and the motor 403 are substantially sealed by the cover member 419 and the motor substrate 421, wind noise and vibration noise generated by the rotation of the rotary polygon mirror 402 and the motor 403 are less likely to leak out of the cover member 419, and noise is less likely to occur. In addition, the airflow generated by the rotation of the rotary polygon mirror 402 and the motor 403 is stabilized, and dust and dirt hardly intrude inside the cover member 419, so that dust and dirt is less likely to adhere to the reflecting surface of the rotary polygon mirror 402.

In the optical box 401, a positioning portion 401c and the rotation stopper portion 401d are provided to protrude from the surface of the optical box 401. A fitting hole to be fitted with the fitting portion 421c of the motor substrate 421 is formed in the positioning portion 401c. The positioning portion 401c is fitted to the fitting portion 421c to restrict the position of the motor substrate 421 in the Y direction and the Z direction with respect to the optical box 401. The rotation stopper portion 401d serving as a restriction portion is a protrusion fitted into the U groove 421d of the motor substrate 421. The rotation stopper portion 401d restricts the motor substrate 421 from rotating about the positioning portion 401c with respect to the optical box 401 in a state where a first screw 423 and a second screw 424 described below are not attached.

In the optical scanning device 104Y of the present embodiment, the cover member 419 is jointly engaged with the optical box 401 together with the motor substrate 421 at three locations by the first screw 423 as the first engagement member. The first screw 423 is installed from the cover member 419 side toward the optical box 401 (−X direction). Therefore, the cover member 419 is provided with screw attachment portions 419b, the motor substrate 421 is provided with first engagement portions 421a, and the optical box 401 is provided with first boss portions 401a.

The screw attachment portion 419b of the cover member 419 is formed for engaging the cover member 419 with the optical box 401 by the first screw 423 and has a through hole through which a shaft portion of the first screw 423 can pass. In the present embodiment, the cover member 419 is formed in a cylindrical shape in cross section, and the screw attachment portions 419b are disposed at three locations at substantially equal intervals along the circumference of the cover member 419. Since the screw attachment portions 419b are disposed at substantially equal intervals, it is difficult for air to uniformly intrude into the cover member 419 along the circumference of the cover member 419.

The first engagement portions 421a of the motor substrate 421 are first through holes through which the shaft portions of the first screw 423 can pass and are disposed at three locations overlapping with the screw attachment portion 419b. The first boss portions 401a of the optical box 401 are boss portions for screwing the first screws 423 in order to attach the cover member 419 and the motor substrate 421 to the optical box 401. The first boss portions 401a include screw holes into which the first screws 423 are respectively screwed, and are disposed at three locations overlapping with the screw attachment portions 419b and the first engagement portions 421a.

In the optical scanning device 104Y of the present embodiment, the motor substrate 421, the motor 403, the rotary polygon mirror 402, and the cover member 419 are stacked on the optical box 401, and the first screws 423 pass through the screw attachment portions 419b and the first engagement portions 421a and are screwed into the first boss portions 401a. As a result, the cover member 419 is jointly engaged with the optical box 401 together with the motor substrate 421 by the first screws 423.

The screw attachment portions 419b, the first engagement portions 421a, and the first boss portions 401a are disposed in the vicinity of the motor 403. The screw attachment portions 419b, the first engagement portions 421a, and the first boss portions 401a, which are portions for engaging the first screw 423, are disposed such that the rotation shaft 403a of the motor 403 is positioned inside a figure formed by connecting the portions (here, the triangle illustrated in FIG. 7B). If so, the portions may not be disposed at substantially equal intervals.

The first screws 423 may be engaged at two or more locations on the motor substrate 421. In the case of two locations, the screw attachment portions 419b, the first engagement portions 421a, and the first boss portions 401a may be disposed such that the rotation shaft 403a of the motor 403 is positioned inside a circle having a diameter that is a straight line connecting the two locations.

Furthermore, in the optical scanning device 104Y of the present embodiment, the motor substrate 421 is further fixed to the optical box 401 by one second screw 424 in addition to the first screws 423 described above. For this purpose, the motor substrate 421 is provided with a second engagement portion 421b, and the optical box 401 is provided with a second boss portion 401b. The first screws 423 are disposed closer to the motor 403 than the second screw 424. In the present embodiment, the second screw 424 and the second boss portion 401b configures a fixing portion for fixing the motor substrate 421 to the optical box 401.

The second engagement portion 421b of the motor substrate 421 is formed to engage the motor substrate 421 with the optical box 401 by the second screw 424 and is a second through hole through which the shaft portion of the second screw 424 can pass. The second boss portion 401b of the optical box 401 are boss portions for screwing the second screw 424 serving as a fixing portion or a second engagement member in order to attach the motor substrate 421 to the optical box 401. The second boss portion 401b has a screw hole into which the second screw 424 is screwed and is disposed so as to overlap with the second engagement portion 421b. The second screw 424 has the same engagement direction as the first screw 423 (−X direction), passes through the second engagement portion 421b of the motor substrate 421, and is screwed into the second boss portion 401b of the optical box 401.

Figure 8A:
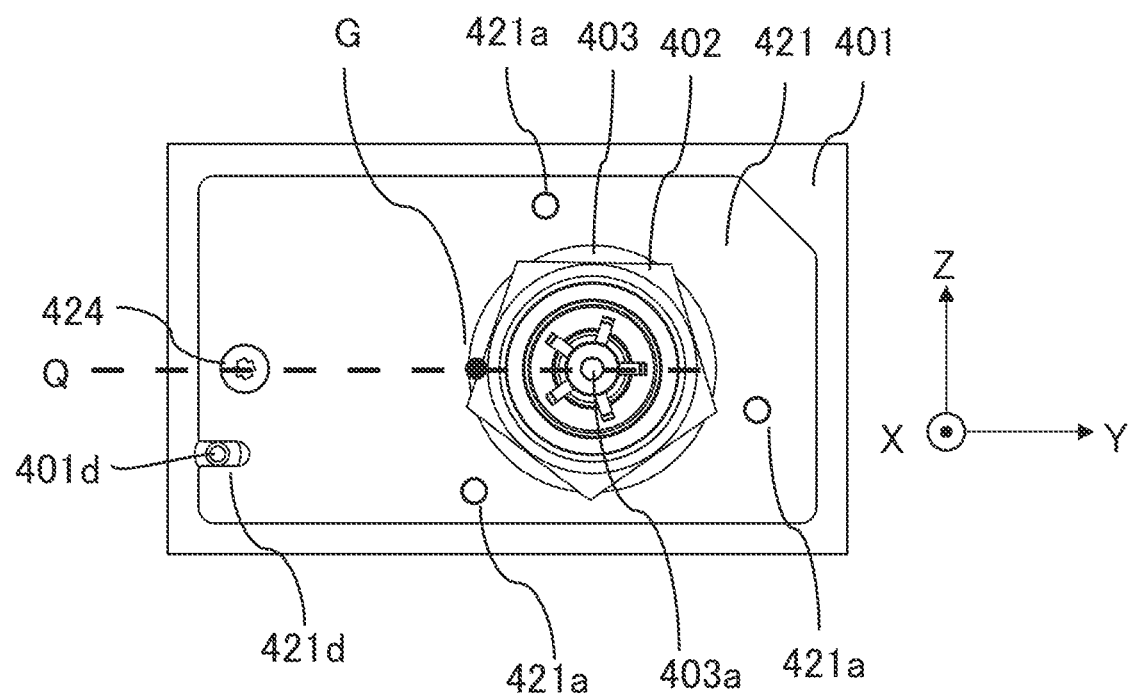
FIG. 8A is a top view illustrating a state in which the cover member is removed in the optical scanning device of the first embodiment.

The second screw 424 fixes the motor substrate 421 on the side opposite to the motor 403 (−Y direction) across a center of gravity G of the motor substrate 421 in the longitudinal direction of the motor substrate 421. In the present embodiment, as illustrated in FIG. 8A described below, the second screw 424 is disposed on a straight line Q connecting the rotation shaft 403a of the motor 403 and the center of gravity G of the motor substrate 421. In this way, in the present embodiment, the motor substrate 421 is fixed to the optical box 401 in a state of being less likely to be bent by the first screws 423 at three locations and the second screw 424 at one location. In this way, since the vibration of the motor 403 rotating at a high speed can be suppressed by the motor substrate 421, the rotary polygon mirror 402 is less likely to vibrate.

In the present embodiment, the first boss portions 401a and the second boss portion 401b in which screw holes are formed protrude from the surface of the optical box 401 to be in a state of being in contact with parts of the motor substrate 421. This is because, if the first boss portions 401a and the second boss portion 401b are not provided in a protruding manner, and screw holes are formed in the main body of the optical box 401, the entire motor substrate 421 is fixed in a state of being in contact with the optical box 401, and the vibration of the motor 403 is easily propagated to the optical box 401 via the motor substrate 421. In addition, this is because the motor substrate 421 is likely to vary in component accuracy, the accuracy of the arrangement position in the optical box 401 is reduced, and the motor substrate 421 is deformed at the time of attachment. Otherwise, an electronic circuit in which electronic components and the like are mounted on both surfaces of the motor substrate 421 may be formed, whereby it is necessary to secure a gap for storing the electronic components and the like between the motor substrate 421 and the optical box 401.

However, even in the case of the present embodiment, even though the cover member 419 covers the rotary polygon mirror 402 and the motor 403 on the motor substrate 421, toners, dusts, and dirt may adhere to the reflecting surface of the rotary polygon mirror 402. That is, when the motor 403 rotates at a high speed, the temperature in the cover member 419 increases due to frictional heat generated by the rotation shaft 403a of the motor 403 and the fitting portion 421c of the motor substrate 421, heat generation of electronic components on the motor substrate 421 by energization, and the like. When the temperature increases, the air expands in the cover member 419, and the air flows out to the outside of the cover member 419 through a minute gap between the motor substrate 421 and the cover member 419. In addition, also outside the cover member 419 in the optical box 401, the temperature rises due to heat generation or the like of the electronic components on the motor substrate 421. Since the air expands as a result, the air flows outside the optical box 401 from a minute gap between the upper lid 417 or the lateral lid 418 and the optical box 401.

Thereafter, when the motor 403 is stopped, the temperature in the optical box 401 or the cover member 419 decreases with the lapse of time. When the temperature decreases, the air in the optical box 401 contracts, and the air flows into the optical box 401. Further, the air in the cover member 419 contracts, and the air in the optical box 401 flows into the cover member 419. The air may include toners, dusts, and dirt, and the toners, the dusts, and dirt may pass through the gap together with the air, intrude into the optical box 401 and further into the cover member 419, and adhere to the reflecting surface of the rotary polygon mirror 402.

If toners, dusts, or dirt adheres to the reflecting surface of the rotary polygon mirror 402, the reflectance of the location where the toners, the dusts, or the dirt adhere decreases. If the reflectance of the rotary polygon mirror 402 decreases, the light amount of reflected laser light decreases, and the image quality of the image formed on the recording material S decreases. Therefore, in the optical scanning device 104Y, cleaning to remove toner, dust, and dirt adhering to the rotary polygon mirror 402 is periodically performed by an operator. A cleaning procedure of the rotary polygon mirror 402 by an operator in the optical scanning device 104Y of the present embodiment is described.

In a case where an operator cleans the rotary polygon mirror 402, the operator removes an exterior cover (not illustrated) of the image forming apparatus 100 to expose the optical scanning device 104Y. Then, the operator removes the upper lid 417 (see FIG. 2C) of the optical scanning device 104 to expose the cover member 419 and the motor substrate 421 arranged in the optical box 401, and the first screws 423 and the second screw 424 engaging the cover member and the motor substrate (see FIG. 7B). That is, in the case of the present embodiment, the operator can easily access each of the first screws 423 and the second screw 424 by removing the upper lid 417.

Figure 8B:
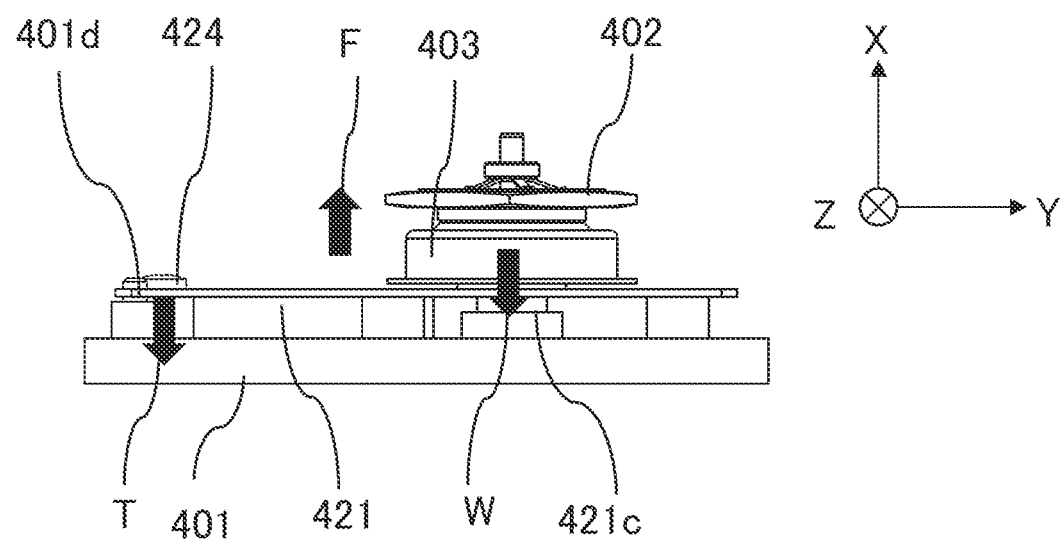
FIG. 8B is a front view illustrating a state in which a cover member is removed in the optical scanning device of the first embodiment.

When the operator removes all the first screws 423, the cover member 419 is separated from the motor substrate 421. FIGS. 8A and 8B illustrate a state in which the cover member 419 is removed. As illustrated in FIGS. 8A and 8B, in a state where the cover member 419 is removed, the operator can wipe the reflecting surface of the rotary polygon mirror 402 with a cloth or the like to remove toners, dusts, and dirt. After cleaning the rotary polygon mirror 402, the operator engages the cover member 419 with the first screws 423 and attaches the cover member to the motor substrate 421. Thereafter, the operator attaches the upper lid 417 to the optical box 401 and attaches the exterior cover of the image forming apparatus 100 to the original position.

Figure 11A:
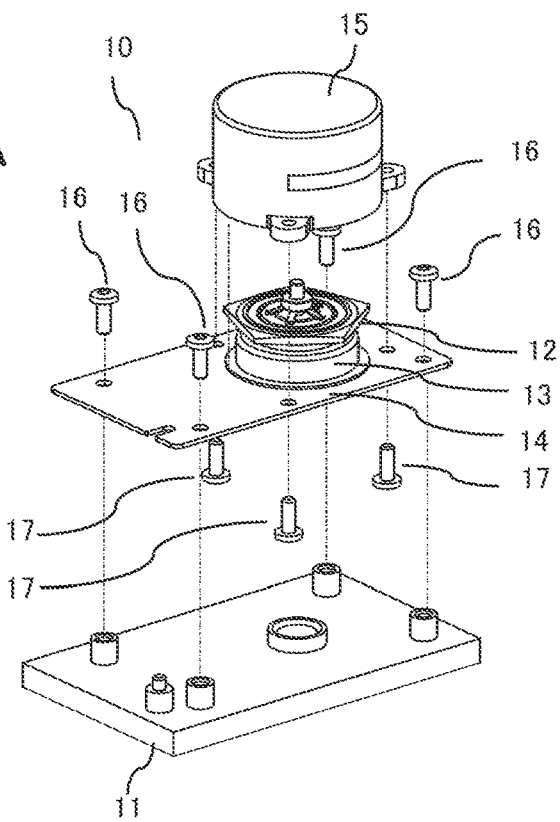
FIG. 11A is an exploded perspective view illustrating an attachment mode of a cover member and a motor substrate in the optical scanning device of a comparative example.
Figure 11B:
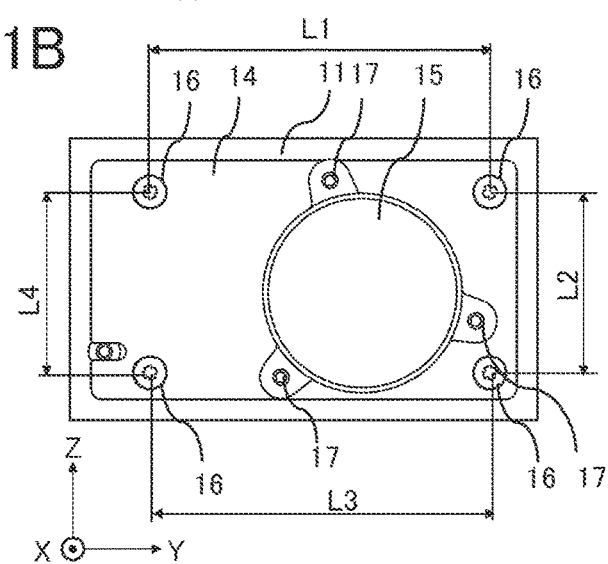
FIG. 11B is a top view illustrating the attachment mode of the cover member and the motor substrate in the optical scanning device of the comparative example.
Figure 11C:
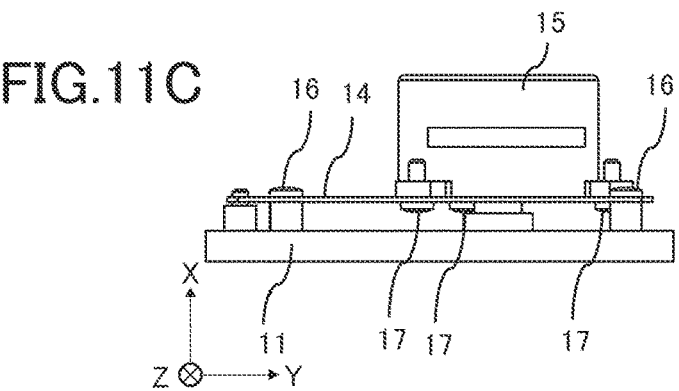
FIG. 11C is a front view illustrating the attachment mode of the cover member and the motor substrate in the optical scanning device of the comparative example.

Here, an optical scanning device 10 of a comparative example is described. FIGS. 11A to 11C illustrate the optical scanning device 10 of the comparative example. The optical scanning device 10 of the comparative example illustrated in FIGS. 11A to 11C has a configuration in which a cover member 15 is engaged with a motor substrate 14 with a cover engagement screw 17, and the motor substrate 14 is fixed to an optical box 11 with a substrate engagement screw 16. In the comparative example, the cover engagement screw 17 is engaged from the "−X direction" side toward the "+X direction" side of the motor substrate 14.

As a problem that may occur in the case of the comparative example, there is degradation in the image quality caused by the vibration of a motor 13. The motor 13 is held on the motor substrate 14 via a bearing. If the motor 13 rotates at a high speed during image formation, large vibration energy is generated to vibrate the motor 13 and the motor substrate 14. Here, the motor substrate 14 is configured to suppress vibration in the X direction by being fixed to the optical box 11 with the substrate engagement screw 16, but the substrate engagement screw 16 needs to be disposed outside the cover member 15, and as illustrated in FIG. 11B, intervals L1 to L4 of the substrate engagement screws 16 become long. If the intervals L1 to L4 are long, the stiffness of the motor substrate 14 in the X direction decreases, whereby the effect of suppressing the vibration of the motor 13 is reduced. As a result, the vibration of the motor 13 in the X direction cannot be suppressed, and accordingly, a rotary polygon mirror 12 vibrates in the X direction, and the trajectory of the laser light to be deflected is shifted, which causes a problem of image quality degradation. As described above, in the optical scanning device 10 of the comparative example, since the intervals L1 to L4 of the substrate engagement screws 16 for fixing the motor substrate 14 are long, the effect of suppressing the vibration generated by the rotation of the motor 13 is reduced.

Figure 7A:
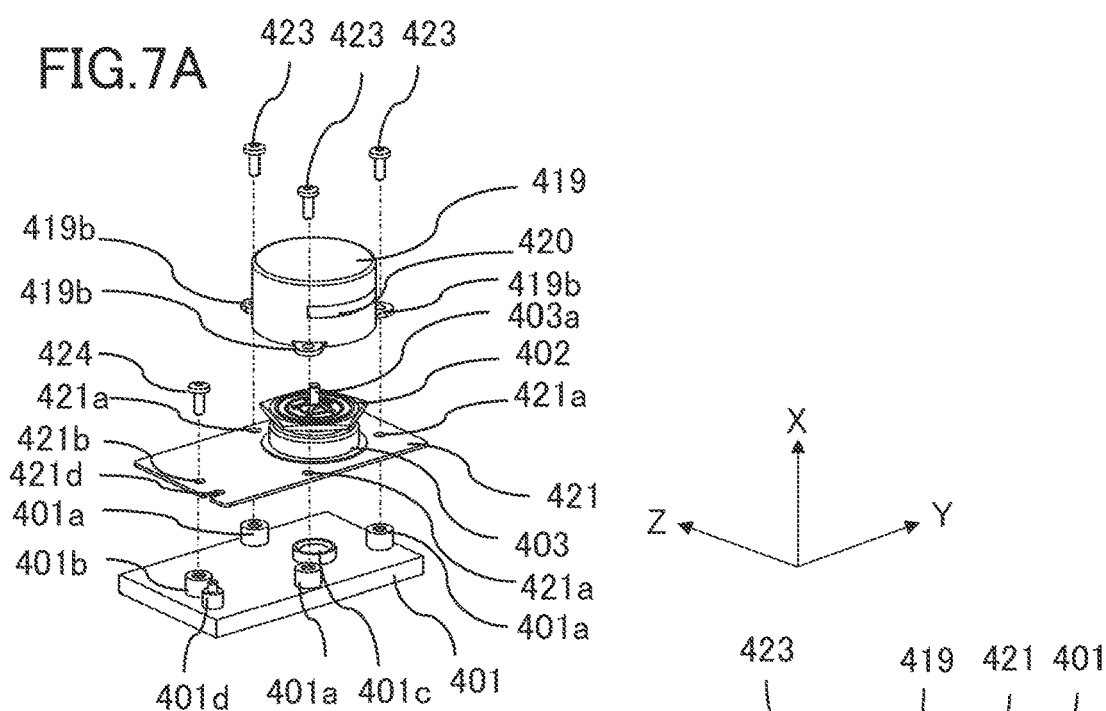
FIG. 7A is an exploded perspective view illustrating an attachment mode of a cover member and a motor substrate in the optical scanning device of a first embodiment.
Figure 7B:
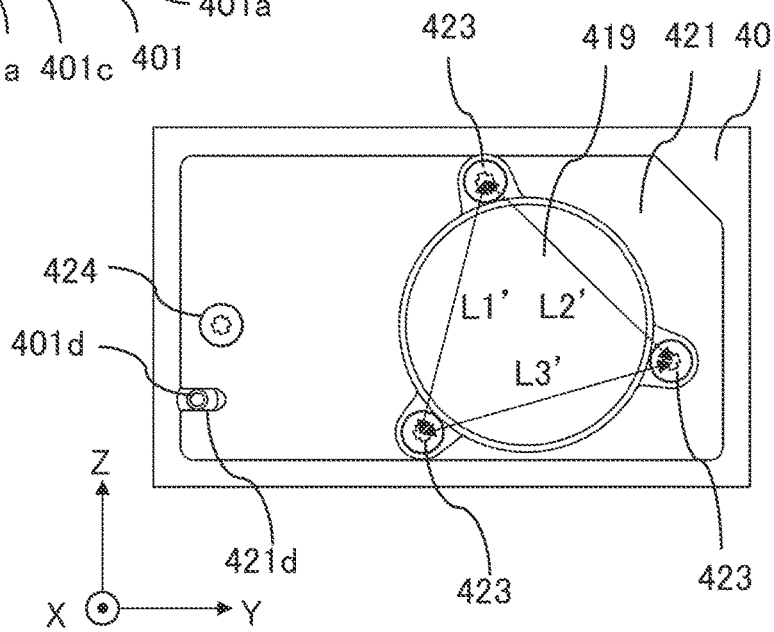
FIG. 7B is a top view illustrating the attachment mode of the cover member and the motor substrate in the optical scanning device of the first embodiment.
Figure 7C:
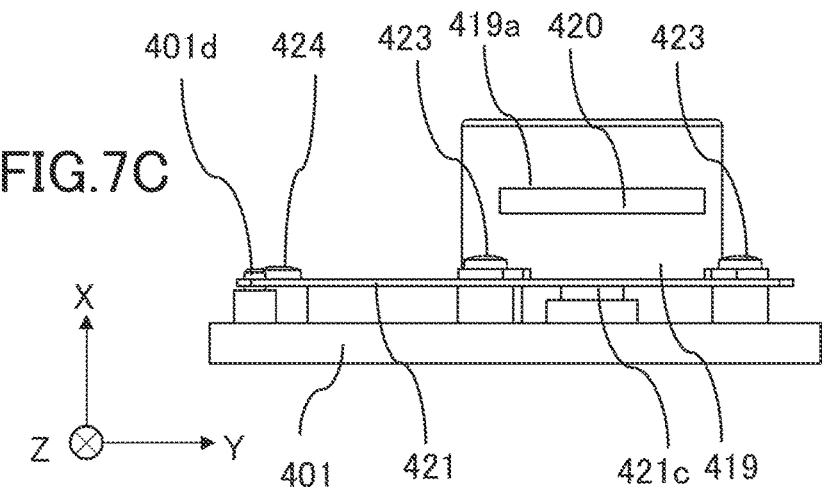
FIG. 7C is a front view illustrating the attachment mode of the cover member and the motor substrate in the optical scanning device of the first embodiment.

On the other hand, in the optical scanning device 104Y of the present embodiment, as illustrated in FIG. 7B, the first screws 423 for fixing the motor substrate 421 are disposed in the vicinity of the motor 403, and intervals L1' to L3' of the first screw 423 are shorter than the intervals L1 to L4 hitherto, and the lengths of the intervals are the same. The joint engagement by the first screw 423 can increase the stiffness of the motor substrate 421 in the vicinity of the motor 403 and can suppress the vibration of the motor substrate 421 in the X direction caused by the motor 403. In addition, since the motor substrate 421 is sandwiched between the cover member 419 and the optical box 401, the effect of suppressing vibration of the motor substrate 421 can be further enhanced.

A problem that may occur in the case of the comparative example is image quality degradation associated with cleaning work of the rotary polygon mirror 12. The cover member 15 substantially seals the rotary polygon mirror 12 and the motor 13 to suppress soiling of the rotary polygon mirror 12, but in practice, dust as fine particles gradually intrude into the cover member 15 from a minute gap between the cover member 15 and the motor substrate 14. When the optical scanning device 10 is used for a long period of time, the surface of the rotary polygon mirror 12 gradually gets dirty. Therefore, it is necessary to remove the cover member 15 and clean the surface of the rotary polygon mirror 12 before image quality is degraded. In the comparative example, since the cover engagement screw 17 is engaged from the −X side to the +X side of the motor substrate 14, the cover member 15 cannot be removed without removing the substrate engagement screw 16. If the substrate engagement screw 16 is removed, and the motor substrate 14 is removed from the optical box 11, when the motor substrate is attached again, the position and posture of the motor substrate 14 may change. As a result, the position and posture of the rotary polygon mirror 12 change, the position where the laser light passes through the lens changes, and a desired position on the photosensitive drum 102Y cannot be irradiated with the laser light, which causes a problem of image quality degradation. As described above, in the optical scanning device 10 of the comparative example, since the cover member 15 is engaged by the cover engagement screw 17 from the "−X direction" to the "+X direction", the motor substrate 14 has to be removed at the time of cleaning the rotary polygon mirror 12, and it is concerned that the optical characteristics are changed.

Meanwhile, in the optical scanning device 104Y of the present embodiment, when the cover member 419 is removed by removing the first screw 423, the second screw 424 keeps the motor substrate 421 fixed to the optical box 401 as illustrated in FIGS. 8A and 8B. That is, when the cover member 419 is removed from the motor substrate 421, the motor substrate 421 provided with the rotary polygon mirror 402 and the motor 403 is left on the optical box 401 by the second screw 424.

In the present embodiment, even if the first screw 423 is removed, the motor substrate 421 is biased to the optical box 401 by a weight W of the motor 403 and engagement force T of the second screw 424. Therefore, even if an external force F is applied to the motor substrate 421 when the cover member 419 is removed, changes in the positions and postures of the motor 403 and the rotary polygon mirror 402 are suppressed. That is, the position and posture of the rotary polygon mirror 402 with respect to the optical box 401 are hardly changed before and after attachment and detachment of the cover member 419.

As described above, in the present embodiment, the cover member 419 can be removed from the motor substrate 421 only by removing the first screw 423 while leaving the motor substrate 421 on the optical box 401 by the second screw 424. As a result, even if the cover member 419 is attached again, the position and posture of the motor substrate 421 do not change. In this way, since the position and posture of the rotary polygon mirror 402 do not change before and after attachment and detachment of the cover member 419, the optical scanning device 104Y can irradiate a desired position on the photosensitive drum 102Y with laser light.

In the present embodiment, both the cover member 419 and the motor substrate 421 are jointly engaged with the optical box 401 by the first screw 423, and the motor substrate 421 is engaged with the optical box 401 by the second screw 424. By this "joint engagement by the first screw 423", deformation of the motor substrate 421 in the thickness direction (X direction) is suppressed, and the motor substrate 421 is less likely to be bent. Specifically, in the "joint engagement by the first screw 423" of the present embodiment, since the interval between the first screws 423 is short, the stiffness of the motor substrate 14 in the thickness direction can be increased in the area where the motor 403 is attached, and thus the effect of suppressing the vibration of the motor substrate 421 in the X direction caused by the motor 403 can be obtained. The sectional secondary moment of the motor substrate 421 is increased by the "joint engagement by the first screw 423", and the resonance frequency for resonating the motor substrate 421 is shifted to the high frequency side, so that the vibration of the motor substrate 421 in the YZ direction can be suppressed. As described above, in the present embodiment, the vibration of the motor substrate 421 caused by the motor 403 can be suppressed with a simple configuration so that the rotary polygon mirror 402 does not vibrate. Furthermore, as compared with the optical scanning device 10 (see FIG. 11A) of the comparative example described above, the number of screws can be reduced owing to the joint engagement by the first screw 423, so that the cost can be reduced.

Second Embodiment

Next, an optical scanning device of a second embodiment is described with reference to FIGS. 9A to 10B. The optical scanning device of the second embodiment is different from the optical scanning device of the first embodiment in that another second screw 724 is used in addition to the second screw 424, and finally the two second screws 424 and 724 are used to fix the motor substrate 421 to the optical box 401. Since other configurations and operations are similar to those of the first embodiment described above, the same reference numerals are given to similar configurations, and the description thereof is simplified or omitted.

Figure 9A:
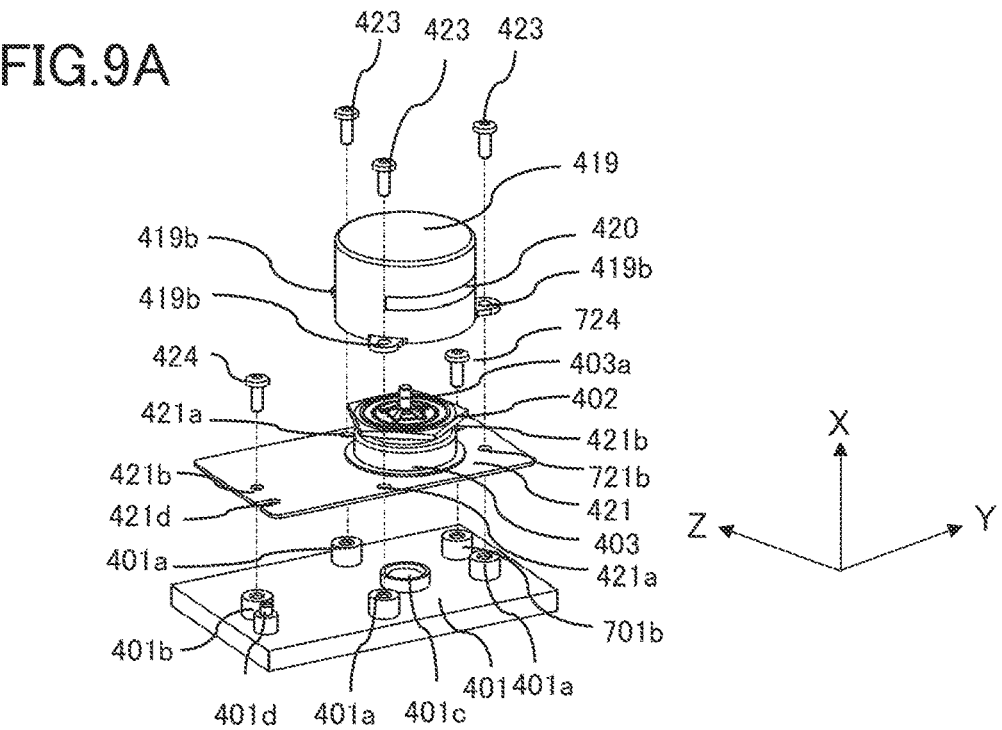
FIG. 9A is an exploded perspective view illustrating an attachment mode of a cover member and a motor substrate in an optical scanning device of a second embodiment.

As illustrated in FIG. 9A, also in the second embodiment, similarly to the first embodiment, the cover member 419 is jointly engaged with the optical box 401 together with the motor substrate 421 at three locations by the first screw 423. Therefore, the cover member 419 is provided with the screw attachment portions 419b, the motor substrate 421 is provided with the first engagement portions 421a, and the optical box 401 is provided with the first boss portions 401a, respectively at three locations.

Therefore, also in the second embodiment, similarly to the first embodiment described above, by simply removing the first screw 423, the cover member 419 can be removed from the motor substrate 421 while leaving the motor substrate 421 in the optical box 401 by the second screws 424 and 724. As a result, since the position and posture of the rotary polygon mirror 402 do not change before and after attachment and detachment of the cover member 419, the optical scanning device 104Y can irradiate a desired position on the photosensitive drum 102Y with laser light.

In the second embodiment, the motor substrate 421 is fixed to the optical box 401 at two locations by the second screws 424 and 724 in addition to three locations of the first screws 423. For this purpose, the motor substrate 421 is provided with the second engagement portion 421b and a second engagement portion 721b, and the optical box 401 is provided with the second boss portion 401b and a second boss portion 701b. The second engagement portions 421b and 721b of the motor substrate 421 is formed to engage the motor substrate 421 with the optical box 401 by the second screws 424 and 724. The second boss portions 401b and 701b of the optical box 401 are boss portions for screwing the second screws 424 and 724 in order to attach the motor substrate 421 to the optical box 401. The second boss portion 401b has a screw hole into which the second screw 424 is screwed, and the second boss portion 701b has a screw hole into which the second screw 724 is screwed.

The second boss portion 401b and the second boss portion 701b are disposed so as to overlap the second engagement portions 421b and 721b, respectively. The second screws 424 and 724 has the same engagement direction as the first screw 423 (−X direction), passes through the second engagement portions 421b and 721b of the motor substrate 421, and is screwed into the second boss portions 401b and 701b of the optical box 401. In the second embodiment, the motor substrate 421 is fixed to the optical box 401 in a state of being less likely to be bent by the first screws 423 and the second screws 424 and 724.

Figure 9B:
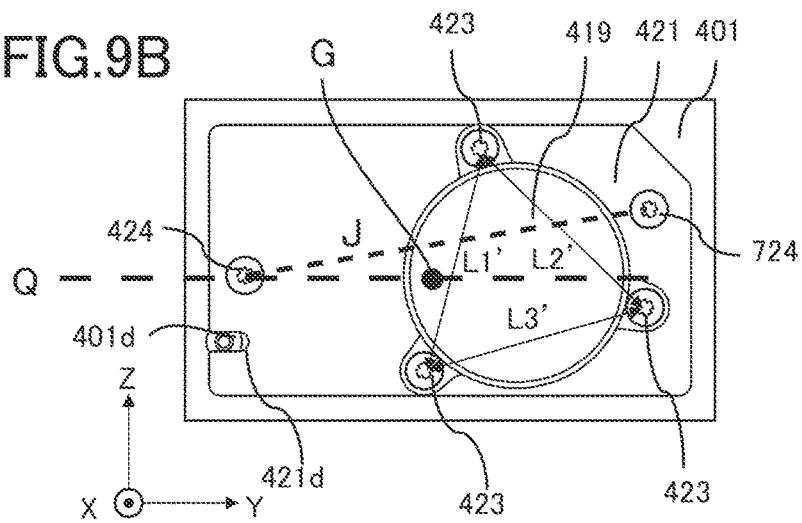
FIG. 9B is a top view illustrating the attachment mode of the cover member and the motor substrate in the optical scanning device of the second embodiment.
Figure 9C:
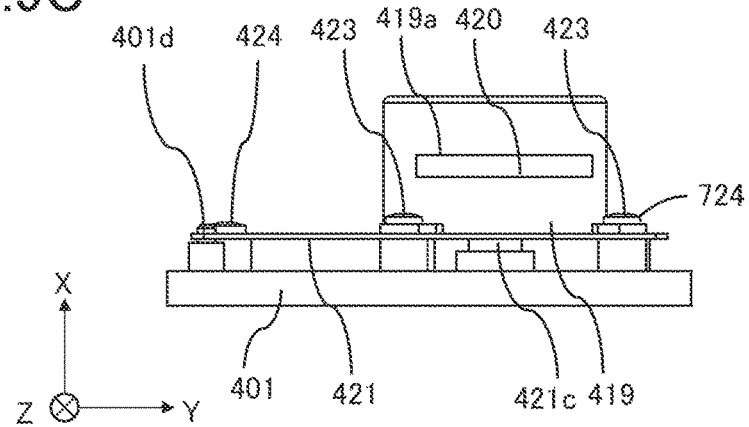
FIG. 9C is a front view illustrating the attachment mode of the cover member and the motor substrate in the optical scanning device of the second embodiment.
Figure 10A:
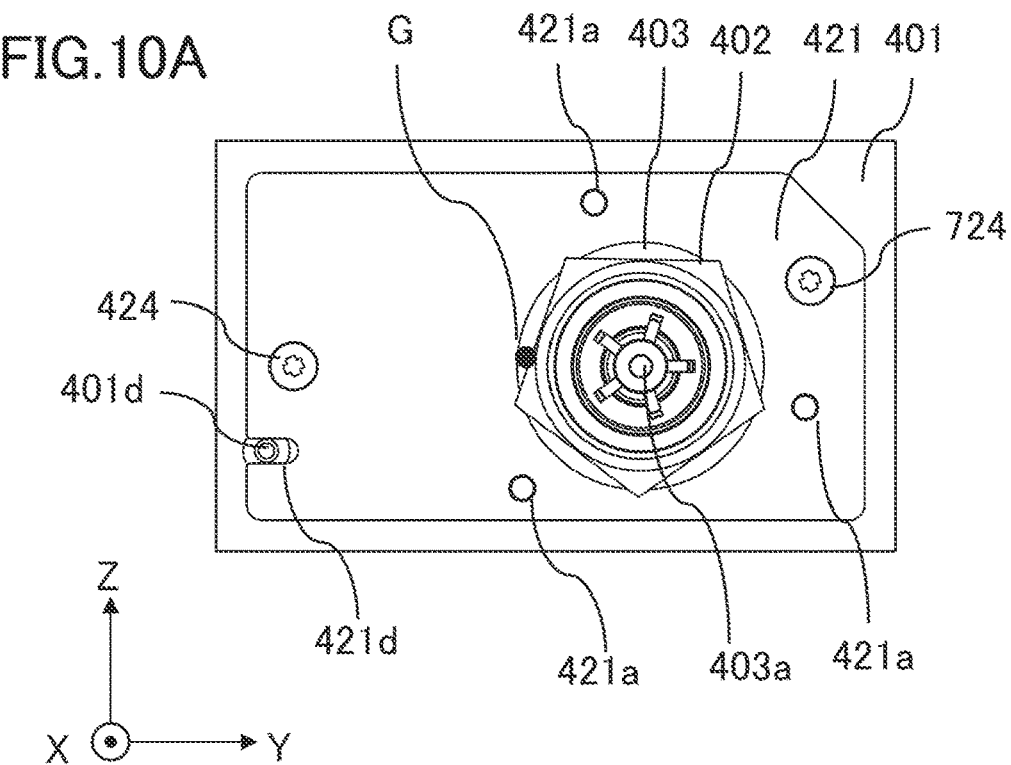
FIG. 10A is a top view illustrating a state in which the cover member is removed in the optical scanning device of the second embodiment.

As illustrated in FIGS. 9B and 10A, the second screw 424 fixes the motor substrate 421 on the side opposite to the motor 403 (−Y direction) across a center of gravity G of the motor substrate 421 in the longitudinal direction of the motor substrate 421. The second screw 724 fixes the motor substrate 421 on the side opposite to the second screw 424 (+Y direction) across the center of gravity G of the motor substrate 421 in the longitudinal direction of the motor substrate 421. The second screw 424 and the second screw 724 are preferably arranged on the straight line Q connecting the rotation shaft 403a of the motor 403 and the center of gravity G of the motor substrate 421. However, as illustrated in FIG. 9B, the second screw 724 may be arranged at a position deviated from the straight line Q. Alternatively, although not illustrated, the second screw 724 may be arranged on the straight line Q, and the second screw 424 may be arranged at a position deviated from the straight line Q. The second screw 424 and the second screw 724 are not limited thereto and may be arranged such that the center of gravity G of the motor substrate 421 is positioned inside a circle having a diameter of a straight line J connecting the screws.

Figure 10B:
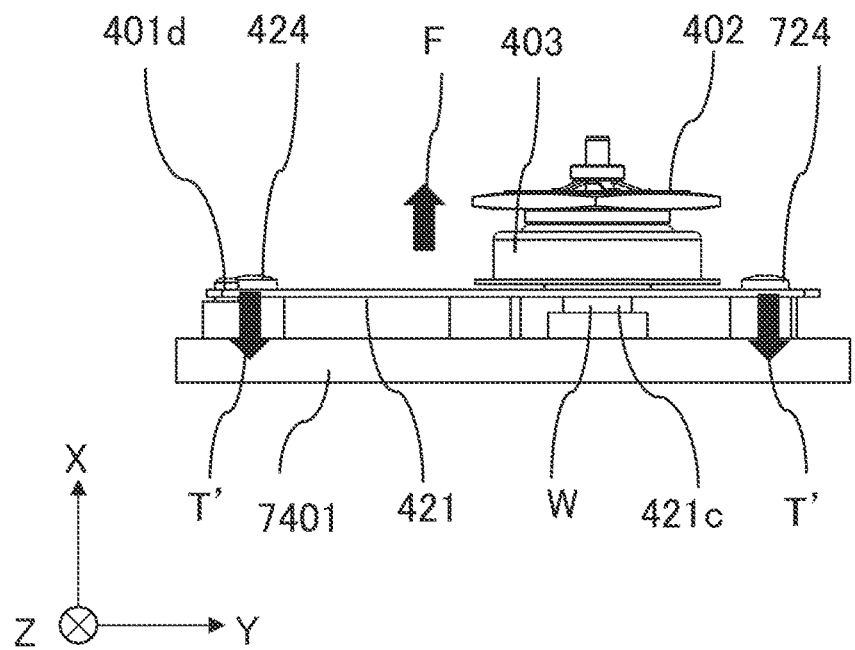
FIG. 10B is a front view illustrating a state in which the cover member is removed in the optical scanning device of the second embodiment.

As in the first embodiment described above, in a case where the motor substrate 421 is fixed by the second screw 424 only at one location, and the external force F (see FIG. 8B) applied to the motor substrate 421 when the cover member 419 is removed is large, the motor substrate 421 is likely to move in the "+X direction", and the position and posture of the rotary polygon mirror 402 may change accordingly. Meanwhile, in the second embodiment, the motor substrate 421 is fixed to the optical box 401 at two locations by the second screws 424 and 724. With such a configuration, as illustrated in FIG. 10B, even if an external force F generated when the cover member 419 is removed is large, engagement force T of the second screws 424 and 724 acts at two locations separated from each other in the longitudinal direction, and thus the movement of the motor substrate 421 in the "+X direction" can be suppressed. Therefore, the position and posture of the rotary polygon mirror 402 is less likely to change.

Other Embodiments

Also, in the first and second embodiments described above, the motor substrate 421 is configured to be fixed to the optical box 401 at one or two locations by the second screws (424 and 724), but the present technology is not limited thereto. For example, the motor substrate 421 may be fixed to the optical box 401 at three or more locations by the second screws. In this case, the second engagement member is disposed such that the center of gravity of the rotation shaft of the motor substrate 421 is positioned inside a polygon formed by connecting the adjacent second screws (for example, a triangle for three locations, a quadrangle for four locations, and a pentagon for five locations).

The first screw 423 and the second screws 424 and 724 may be the same or different. If the screws are different from each other, it is possible to prevent an operator from removing the second screws 424 and 724 by mistake for the first screws 423 when removing the cover member 419 from the motor substrate 421. Therefore, the screws are preferably different from each other.

The first screw 423 and the second screws 424 and 724 are not limited to be installed from the cover member 419 side toward the optical box 401 and may be installed from the optical box 401 side toward the motor substrate 421 side. However, from the viewpoint of easiness of attachment and detachment of the cover member 419, it is preferable that the first screw 423 and the second screws 424 and 724 are provided so as to be mountable from the cover member 419 side toward the optical box 401.

The motor substrate 421 is not limited to being fixed to the optical box 401 by the second screws 424 and 724 and may be fixed to the optical box 401 by adhesion. However, in a case where a defect occurs in the motor substrate 421, it is necessary to replace the motor substrate 421. Therefore, if the motor substrate 421 is adhered to the optical box 401, it is likely that the optical box 401 is damaged or the removed motor substrate 421 is damaged at the time of removing the motor substrate 421, thereby becoming difficult to reuse the optical box or the motor substrate. Therefore, the motor substrate 421 is preferably fixed to the optical box 401 by the second screws 424 and 724 described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-177969, filed Nov. 7, 2022, hereby incorporated by reference herein in its entirety.

What is claimed is:

1. An optical scanning device configured to expose a charged surface of a photosensitive member to form an electrostatic latent image, the optical scanning device comprising:
   a light source configured to emit light;
   a deflector configured to deflect the light emitted from the light source;
   a driving unit configured to rotationally drive the deflector;
   a control substrate provided with the driving unit and the deflector and configured to control the driving unit;
   a cover member configured to cover the deflector;
   a casing on which the control substrate is mounted;
   a plurality of first engagement members configured to jointly engage and fix the cover member and the control substrate to the casing such that the cover member is detachably attached; and
   a second engagement member configured to fix the control substrate to the casing,
   wherein the second engagement member maintains the control substrate fixed to the casing even in a state where engagement by the plurality of the first engagement members is released and the cover member has been removed from the deflector.

2. The optical scanning device according to claim 1, wherein the plurality of first engagement members are installed from a side of the cover member toward the casing.

3. The optical scanning device according to claim 2, wherein:
   the plurality of first engagement members are a plurality of screws,
   the cover member includes an attachment portion to which the plurality of screws are attached,
   the control substrate includes a plurality of first through holes through which shaft portions of the plurality of screws pass,
   the casing includes a plurality of boss portions including a plurality of screw holes respectively engaged with the plurality of screws, and
   the cover member is engaged with the casing by the plurality of screws so as to sandwich the control substrate between the cover member and the casing.

4. The optical scanning device according to claim 1, wherein the plurality of first engagement members are arranged closer to the driving unit than the second engagement member.

5. The optical scanning device according to claim 4, wherein the plurality of first engagement members are three or more engagement members and are disposed on the control substrate such that a rotation shaft of the driving unit is positioned inside a polygon formed by connecting adjacent engagement members, among the plurality of first engagement members.

6. The optical scanning device according to claim 1, wherein the second engagement member is disposed at one location on the control substrate, the one location being located on a straight line passing through a rotation shaft of the driving unit and a center of gravity of the control substrate and on a side opposite to the rotation shaft with the center of gravity of the control substrate interposed therebetween.

7. The optical scanning device according to claim 1, wherein the second engagement member is installed from a side of the control substrate toward the casing.

8. The optical scanning device according to claim 7, wherein:
   the plurality of first engagement members are a plurality of first screws,
   the second engagement member is a second screw,
   the control substrate includes a second through hole through which a shaft portion of the second screw passes, and
   the casing includes a second boss portion in which a screw hole for engaging the second screw is formed.

9. The optical scanning device according to claim 8, wherein the casing includes a restriction portion configured to restrict rotation of the control substrate with respect to the casing.

10. The optical scanning device according to claim 1, further comprising:
    another second engagement member,
    the second engagement member and the another second engagement member are arranged at two locations on the control substrate, and
    a center of gravity of the control substrate is positioned inside a circle having a diameter of a straight line connecting the second engagement member and the another second engagement member arranged at the two locations.

11. An optical scanning device configured to expose a charged surface of a photosensitive member to form an electrostatic latent image, the optical scanning device comprising:
a light source configured to emit light;
a deflector configured to deflect the light emitted from the light source;
a driving unit configured to rotationally drive the deflector;
a control substrate provided with the driving unit and the deflector and configured to control the driving unit;
a cover member configured to cover the deflector;
a casing on which the control substrate is mounted;
a first engagement member configured to engage with the casing; and
a second engagement member configured to engage with the casing,
wherein the cover member and the control substrate are fixed to the casing via the first engagement member, and
wherein the control substrate is fixed to the casing via the second engagement member without the second engagement member fixing the cover to the casing.

12. The optical scanning device according to claim 11, wherein the first engagement member is a screw configured to screw into the casing and the second engagement member is a screw configured to screw into the casing.

13. The optical scanning device according to claim 11, wherein the first engagement member is installed from a side of the cover member toward the casing.

14. The optical scanning device according to claim 13, wherein:
the first engagement member is a screw,
the cover member includes an attachment portion to which the screw is attached,
the control substrate includes a first through hole through which a shaft portion of the screw passes,
the casing includes a boss portion including a screw hole engaged with the screw, and
the cover member is engaged with the casing by the screw so as to sandwich the control substrate between the cover member and the casing.

15. The optical scanning device according to claim 11, wherein the first engagement member is arranged closer to the driving unit than the second engagement member.

* * * * *